Nov. 20, 1923.

E. WESSALE 1,474,871

APPARATUS FOR PREPARING CANE FOR EXTRACTION

Original Filed Aug. 16, 1920   3 Sheets-Sheet 2

INVENTOR
EDWARD WESSALE
By Paul & Paul
Attorneys

Patented Nov. 20, 1923.

1,474,871

UNITED STATES PATENT OFFICE.

EDWARD WESSALE, OF WACONIA, MINNESOTA.

APPARATUS FOR PREPARING CANE FOR EXTRACTION.

Original application filed August 16, 1920, Serial No. 403,996. Divided and this application filed February 17, 1922. Serial No. 537,263.

*To all whom it may concern:*

Be it known that I, EDWARD WESSALE, a citizen of the United States, resident of Waconia, county of Carver, State of Minnesota, have invented certain new and useful Improvements in Apparatus for Preparing Cane for Extraction, of which the following is a specification.

This invention relates to apparatus employed in the manufacture of sirups and sugar from sorghum and sugar cane. It more specifically refers to a novel cutting means for cutting the harvested cane, including its stalks, leaves and sheaths and thrash, into relatively short sections. By this apparatus the material is converted into a loose mass of short sections of cane stalks, leaves, sheaths, etc., in which the leaves and sheaths are detached from the stalks. The heavier stalk sections may then easily be separated from the other waste material preparatory to the extraction.

The object of this invention is to provide an improved apparatus for preparing cane for extraction.

Other objects of the invention will more fully appear from the following description and the accompanying drawings and will be pointed out in the annexed claims.

In the accompanying drawings, there has been disclosed a structure designed to carry out the objects of the invention, but it is to be understood that the invention is not confined to the exact features shown, as various changes may be made within the scope of the claims which follow.

Figure 1:
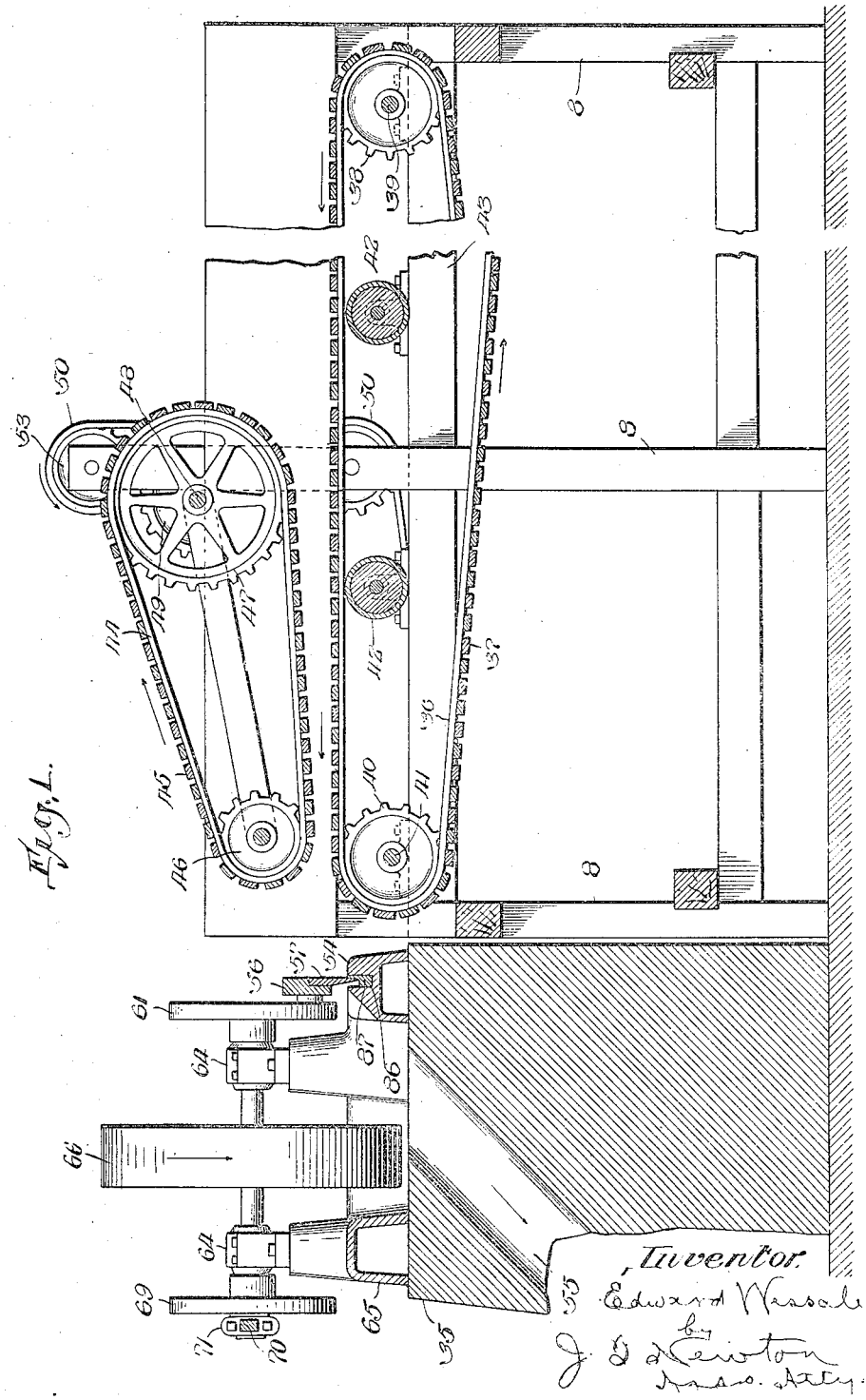
Figure 1 is a cross-sectional view of the cutting mechanism and showing an associated cane feeding means in longitudinal section.

The selected embodiment of the novel apparatus here shown is a separable part of that disclosed in the prior pending application of the inventor hereof, Serial Number 403,996, filed August 16, 1920, of which this application is divisional.

The principal function of this cutting means is to cut into relatively short sections the harvested cane from which the tops have preferably been previously removed. As this novel apparatus is at present employed, the cane is cut into sections about four and one-half inches to five inches in length. The present commercial embodiment of this invention here shown is adjusted to treat sorghum cane in which the free leaf is about twenty-four inches while the sheath closely adjacent the stalk is about ten inches. Hence, when the cane is cut into four and one-half inch sections, the maximum sheath portion remaining on the stalk is only four and one-half inches while the whole leaf and a portion of the sheath is separated therefrom.

A feeding means is employed for feeding the cane longitudinally or endwise to the cutting mechanism. Such means is of the conveyer type and consists of two opposed endless chains 36 to which are transversely secured a plurality of bars 37 in closely spaced relation to form an endless apron to convey the cane therefrom. The cane is preferably delivered to this conveyer so that the cane is fed to the cutting means with the butt end first. Adjacent the receiving end, the apron chains 36 engage opposed similar idler sprockets 38 fast on a stud shaft 39 rotatably borne by the frame 8 of the conveyer support. At the delivery end, the chains 36 engage and are driven by two similar opposed sprockets 40 which are keyed to a shaft 41.

As the cutting means is preferably of the reciprocating knife type which has an effective drawing action in transversely slicing the cane into the desired short section, it is therefore preferable to provide the conveyer with an intermittent motion so that during the cutting or slicing operation the presented cane is held stationary. The means for intermittently driving the shaft 41 will be pointed out subsequently in connection with the description of the operation of the cutting means.

Figure 5:
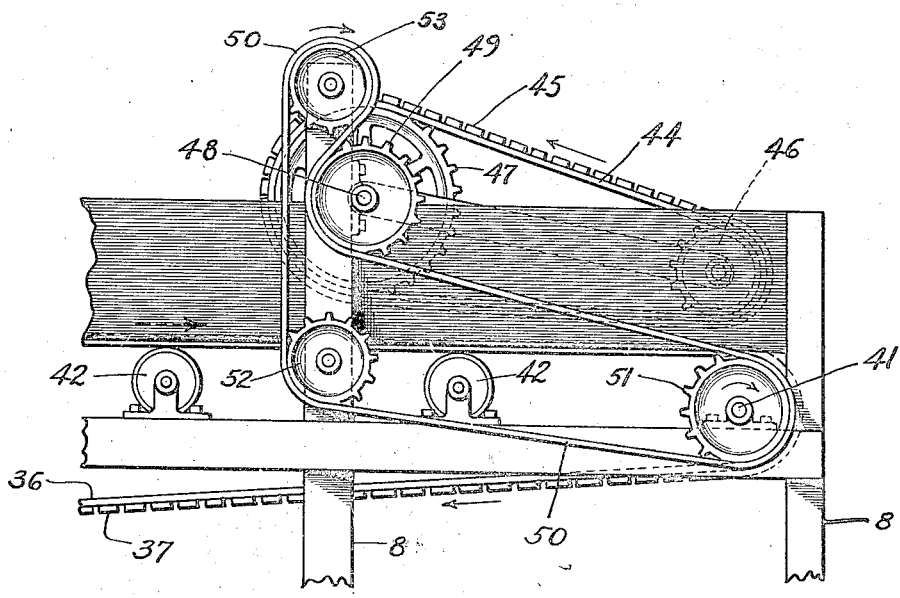
Figure 5 is a view in side elevation of the drive of the complementary endless elements of the cane feeding means.

A plurality of idler rollers 42 are rotatably journaled on brackets carried by the longitudinal support 43 of the conveyer frame. The two endless chains 36 move over the surface of these rollers which aid in supporting the load during the working travel of the apron. It is preferable to provide a supplemental member moving both adjacent to and in the same direction as the working apron. The purpose of this supplemental member or apron is to hold the cane firmly when it is approaching and also during the slicing operation. This supplemental apron is similar to the conveyer apron and consists of opposed chains 44 having bars 45 transversely secured thereto. These chains are mounted upon opposed sprockets 46 and 47 rotatably borne by the conveyer frame. The rear sprockets 47 are preferably keyed to a stud shaft 48 which has also fast thereon a sprocket 49 by means of which the supplemental apron is driven from the apron shaft 41 by means of a chain 50 driven by a sprocket 51 fast on the shaft 41 (see Figure 5). The chain 50 is engaged by the idlers 52 and 53, rotatably borne by the conveyer frame. By means of this drive, adjacent and opposed faces of the two aprons are driven in the same direction and at the same rate of speed. Likewise, as the apron is intermittently driven from the shaft 41, the supplemental apron will similarly be intermittently driven.

The means for receiving the presented cane is located adjacent the delivery terminus of the conveyer. A platform 54 extends transversely the front end of the conveyer and is adapted to receive the cane as discharged thereon by the conveyer. The platform 54, as employed in this embodiment of the invention, is a portion of an integral metallic casting 65 which is relatively narrow and generally rectangular in form. This casting is suitably bolted to a foundation or support 35 preferably of concrete.

Means to receive and to deliver the sectioned cane from the knife are provided. A simple means of carrying out such function is by way of gravity chute 55, having its upper end adjacent the knife. This chute is preferably formed through the support 35 and it downwardly and rearwardly extends for gravity delivery of the sectioned cane and associated material.

Figure 2:
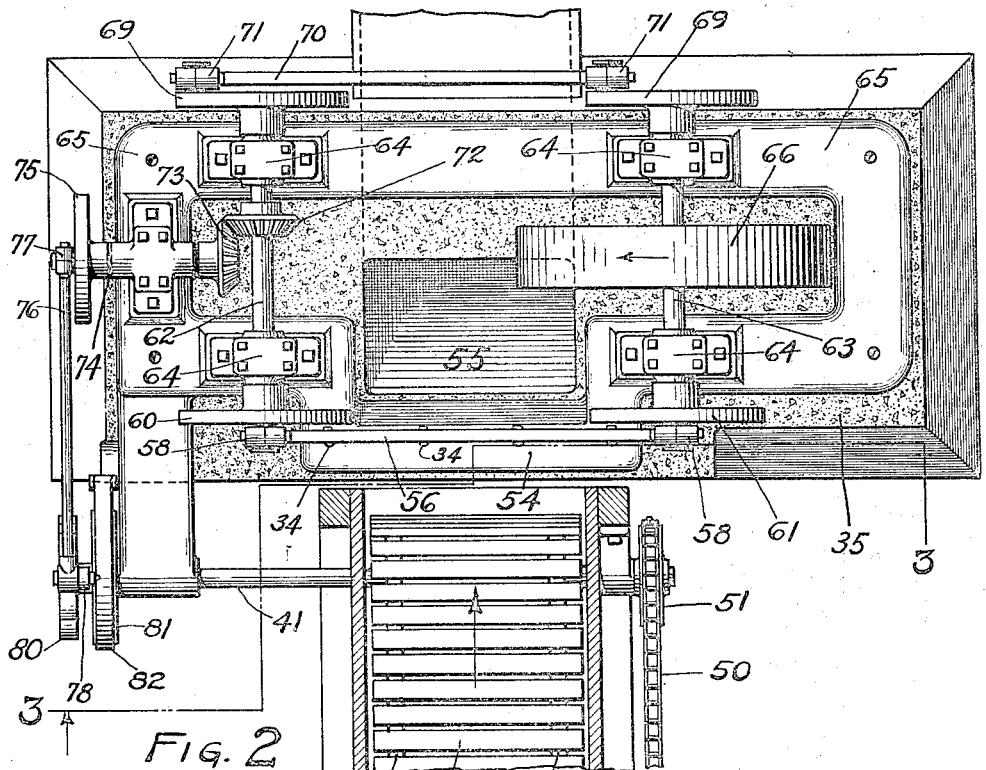
Figure 2 is a view in plan of the cutting mechanism.

The novel cutting means comprises an elongated knife bar 56 carrying a similarly shaped knife 57 demountably bolted thereto by means of the bolts and nuts 34. The knife bar 56 is terminally mounted in bearing boxes 58 pivotally carried on pins 59 eccentrically mounted on rotatable members such as disks 60 and 61 keyed respectively to the shafts 62 and 63. These shafts are rotatably borne in spaced relation upon the support. Bearings 64 are secured to the opposed sides of the casting 35, each shaft being provided with a front and a rear bearing as shown in Figure 2. While these shafts may both be directly driven from a source of power, it is preferred to drive one shaft and to provide connecting means between the two shafts whereby they are synchronously actuated. The shaft 63 has a pulley 66 keyed thereto. This pulley is adapted to be driven from a suitable source of power by means of a belt. The connecting means between the shafts is provided by way of wheels 69 keyed to the ends of the shafts 62 and 63 opposite to the disks 60 and 61. A connecting rod has its terminals pivoted to bearing boxes 71 eccentrically mounted on the wheels 69. This connecting rod is preferably a quadrant in advance of the knife bar 56.

Figure 4:
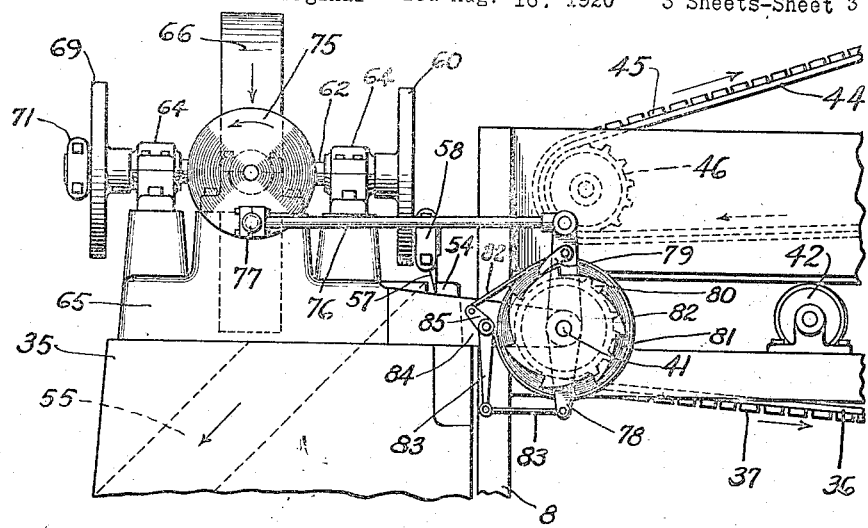
Figure 4 is a view in end elevation of the same.

The endless conveyers are intermittently driven in timed relation to the knife actuation by means of a driving connection between the conveyers and one of these shafts. As here shown, (see Figure 2) a bevel gear 72 is keyed to the shaft 62 and meshes with the gear 73 carried by a stud shaft 74 journaled on the adjacent built-up end portion of the casting 65. This shaft 74 has a disk 75 keyed thereon. A connecting rod 76 is borne at one end by a bearing box 77 eccentrically mounted on the disk 75 and its other end is pivoted to one end portion of a rocker arm 78 freely mounted on the shaft 41. A dog 79 is pivotally mounted on the upper portion of the rocker arm 78, as shown in Figure 4. The dog 79 is adapted to engage the teeth of a ratchet 80 which is fast on the shaft 41 whereby the shaft is given an intermittent rotation in one direction. The cane-feeding or presenting apron is thereby actuated by and in timed relation to the cutting mechanism through the shaft 41 as previously stated. In order that the momentum of the traveling apron may be arrested, a stop-motion is employed. A drum 81 is keyed to the shaft 41 and is peripherally engaged by a brake band 82 of the external contracting type. The brake band 82 is alternately contracted upon the drum and released therefrom by means of pivotally joined links 83 pivotally borne at the lower end of the lower portion of the rocker arm 78 and at the upper end pivotally borne by a bracket 84 extending from the casting 65. The upper link 83 carries a finger 85 to which one end of the brake band is secured, the other end of the brake band being secured to the stationary bracket 84. In the position of the mechanism, in Figure 4, the knife has completed the cutting operation, at which time the connecting rod 76 has moved to the right both to release the brake band and to carry the dog 79 to the right to engage a ratchet tooth in order to rotate the ratchet in counter-clockwise direction toward the completion of which motion the brake band will be tightened on its drum and movement of the shaft 41 arrested.

The platform is preferably provided with a recess so that the knife may travel through the feeding plane of the platform in its cutting travel. Furthermore, a bar, recessed to receive the knife edge portion, is adjustably mounted in the platform recess. This bar co-operates with the knife in its cutting function and is adjustable to compensate for wear.

Figure 3:
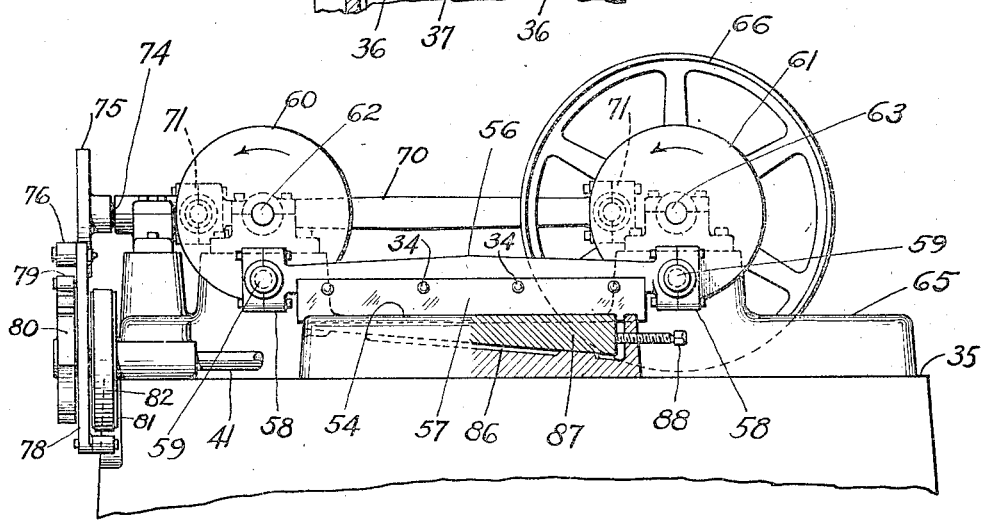
Figure 3 is a view in front elevation of the same.

A recess 86 extends transversely of the platform 54. A bar 87, preferably of steel, is seated in this recess and is itself longitudinally recessed or grooved to receive the knife edge. Preferably the platform recess 86 has its bottom or lower surface inclined as shown in dotted lines in Figure 3. The lower face or edge of the bar 87 is similarly inclined. This inclination of the bottom surface of the recess and bar permits of a wear-compensating adjustment of the bar 87 by means of the adjusting screw 88 received in threaded engagement in an aperture in the platform leading to the recess 86. Movement of the screw 88 in a clockwise direction effects the longitudinal movement of the bar to the left of its position shown in Figure 3 with the result that the groove thereof is presented to the knife at a relatively higher elevation to compensate for wear of the cutting parts.

Thus, the cane material longitudinally placed on the conveyer is delivered to the cutting platform with an intermittent motion, the eccentrically borne knife in its descending travel through the plane of the receiving platform cuts the cane material into sections while held by the co-operable endless aprons, and the cut or sectioned cane material or cane, as it may be termed for sake of brevity, is dropped down the adjacently presented gravity chute where it is further treated to separate the relatively heavier stalk portions from the lighter refuse material.

Having thus described my invention, what I claim as new and desire to secure by Letters-Patent, is:

1. In an apparatus for preparing cane for extraction, the combination of an eccentrically mounted knife guided to maintain its edge at all times in the same plane and adapted to provide a succession of drawing cuts, means to actuate the knife, means to present cane longitudinally to said knife whereby the cane is transversely cut into sections, and means to actuate the last mentioned means.

2. In an apparatus for preparing cane for extraction, the combination of a support, a pair of spaced members rotatably mounted on the support having their axes of rotation parallel and being arranged at right angles to said axes in transverse alinement, a knife extending between and eccentrically mounted adjacent its end to said rotatable members, said knife being co-operable with the support to cut cane fed thereto, and means to actuate synchronously said rotatable members.

3. In an apparatus for preparing cane for extraction, the combination of a support, a pair of shafts rotatably mounted in spaced relation on said support, crank disks mounted on said shafts in transverse alinement, a knife extending between and eccentrically carried by said shafts, and co-operable with said support to cut cane fed thereto, connecting means to synchronize rotation of said shafts, and means to actuate one of said shafts.

4. In an apparatus for preparing cane for extraction, the combination of a cutting platform adapted to have cane longitudinally fed thereto, an elongated knife mounted adjacent said platform, the platform having an elongated recess therein to receive the knife whereby the knife in its cutting stroke travels through the feeding plane of said platform, a bar seated in said recess and co-operable with said knife to cut the fed cane into transverse sections, and means for adjusting the position of the bar in said recess whereby compensation may be had for wear.

5. In an apparatus for preparing cane for extraction, the combination of a cutting platform adapted to have cane longitudinally fed thereto, an elongated knife mounted adjacent said platform, the platform having an elongated recess therein to receive the knife whereby the knife in its cutting stroke travels through the feeding plane of said platform, a bar seated in said recess and co-operable with said knife to cut the fed cane into transverse sections, the bottom of said recess being inclined and the lower edge of said bar being inclined complementarily thereto, and means for longitudinally adjusting said bar in the recess whereby compensation for wear is provided.

6. In an apparatus for preparing cane for extraction, the combination of a cutting platform whereover the cane to be cut is fed, said platform being provided with a transversely extending recess therein having a bottom inclined transversely of the surface of the platform, a bar seated in said recess and having an inclined under surface resting on the bottom of the recess, means to move said bar along said recess, and a cutting knife mounted above said bar to co-operate therewith.

7. In an apparatus for preparing cane for extraction, the combination of a cutting platform whereover the cane to be cut is fed and wherein there is provided a transverse slot closed at one end and having the bottom inclined in the direction of its length, a bar seated in said slot and having its lower surface inclined to correspond with the bottom of the slot, a screw threaded through the closed end of the recess and engaging against the bar, and a knife mounted above said bar and movable toward and from the bar to cooperate therewith.

8. In an apparatus for preparing cane for extraction, a conveyor, a plurality of pairs of alined bearings mounted at one end of the conveyor, one pair of said bearings being on one side of the conveyor and the other pair on the other side thereof, a shaft supported in each pair of bearings, a crank disk on each end of each shaft, one of said crank disks on each shaft being located adjacent the conveyor, a knife having its ends pivotally connected to the respective crank disks adjacent said conveyor, and a connecting rod connecting the remaining crank disk.

In witness whereof, I have hereunto set my hand this 13th day of February, 1922.

EDWARD WESSALE.